US007757441B1

(12) United States Patent
Whittaker

(10) Patent No.: US 7,757,441 B1
(45) Date of Patent: Jul. 20, 2010

(54) APPARATUS FOR ISOLATING AND LEVELING A MACHINE FOUNDATION

(75) Inventor: Wayne H. Whittaker, Horton, MI (US)

(73) Assignee: Unisorb, Inc., Jackson, MI (US)

(*) Notice: Subject to any disclaimer, the term of this patent is extended or adjusted under 35 U.S.C. 154(b) by 987 days.

(21) Appl. No.: 11/333,861

(22) Filed: Jan. 17, 2006

Related U.S. Application Data

(63) Continuation-in-part of application No. 10/877,130, filed on Jun. 25, 2004, now abandoned, which is a continuation-in-part of application No. 10/692,442, filed on Oct. 23, 2003, which is a continuation-in-part of application No. 10/280,446, filed on Oct. 25, 2002, now Pat. No. 7,125,077.

(60) Provisional application No. 60/750,989, filed on Dec. 16, 2005.

(51) Int. Cl.
*E04B 1/98* (2006.01)
(52) U.S. Cl. ............ 52/167.4; 52/573.1; 248/562; 248/574; 267/248
(58) Field of Classification Search ............ 52/167.1, 52/167.4, 167.6, 1, 2.11, 2.13, 167.7, 167.8, 52/573.1, 167.2, 167.3, 167.9; 248/562, 248/631, 636, 358, 574; 267/34, 248, 249
See application file for complete search history.

(56) References Cited

U.S. PATENT DOCUMENTS

| | | | |
|---|---|---|---|
| 2,055,000 A | 9/1936 | Bacigalupo | |
| 2,359,915 A | 10/1944 | Hussman | |
| 2,605,066 A | 7/1952 | Brown | |
| 2,660,386 A | 11/1953 | Munro | |
| 2,660,387 A | 11/1953 | Roy | |
| 3,239,185 A | 3/1966 | Sweeney et al. | |
| 3,332,647 A | 7/1967 | Young | |
| 3,667,707 A * | 6/1972 | Mui | 248/550 |
| 3,794,277 A * | 2/1974 | Smedley et al. | 248/548 |
| 3,892,398 A | 7/1975 | Marsh | |
| 4,047,427 A | 9/1977 | Young | |
| 4,135,392 A | 1/1979 | Young | |
| 4,402,483 A | 9/1983 | Kurabayashi et al. | |
| 4,496,130 A * | 1/1985 | Toyama | 248/585 |
| 4,565,039 A | 1/1986 | Oguro et al. | |
| 5,205,100 A * | 4/1993 | Lecointre | 52/573.1 |
| 5,242,147 A | 9/1993 | Kemeny | |

(Continued)

FOREIGN PATENT DOCUMENTS

DE      2 327 310      1/1974

(Continued)

*Primary Examiner*—Richard E Chilcot, Jr.
*Assistant Examiner*—William V Gilbert
(74) *Attorney, Agent, or Firm*—Young, Basile, Hanlon & MacFarlane, P.C.

(57) ABSTRACT

An apparatus for isolating and leveling a machine foundation with respect to a substructure of a building or the ground. The apparatus of the present invention provides an enclosure connectable to the machine foundation. A load bearing member is disposed within and adjustably connected to the enclosure. A primary support member and a secondary support member are positioned between the bearing member and the substructure for isolating the machine foundation from the substructure. The magnitude of force carried by the secondary support member may be adjusted to consequently adjust the natural frequency of the machine foundation.

14 Claims, 11 Drawing Sheets

U.S. PATENT DOCUMENTS

| | | |
|---|---|---|
| 5,291,967 A | 3/1994 | Aoki |
| 5,456,047 A | 10/1995 | Dorka |
| 5,573,220 A | 11/1996 | Whittaker et al. |
| 5,577,703 A | 11/1996 | Young |
| 5,595,371 A * | 1/1997 | Hukuda et al. ............... 267/34 |
| 5,682,712 A | 11/1997 | Kemeny |
| 5,738,330 A | 4/1998 | Folkens et al. |
| 5,797,228 A | 8/1998 | Kemeny |
| 6,547,225 B1 | 4/2003 | Nelson |
| 7,077,250 B2 * | 7/2006 | Folkens et al. ............... 188/380 |
| 2003/0071187 A1 | 4/2003 | Herren et al. |

FOREIGN PATENT DOCUMENTS

| | | |
|---|---|---|
| DE | 101 17 268 A 1 | 10/2001 |
| DE | 100 50 410 | 1/2002 |
| JP | 09 067956 A | 3/1997 |
| JP | 2002167779 | 11/2002 |
| WO | WO 02/14624 A 1 | 2/2002 |

* cited by examiner

APPARATUS FOR ISOLATING AND LEVELING A MACHINE FOUNDATION

This application claims the benefit of provisional patent application Ser. No. 60/750,989, filed Dec. 16, 2005, and this application is a continuation-in-part of patent application Ser. No. 10/877,130, filed Jun. 25, 2004, now abandoned which is a continuation-in-part of patent application Ser. No. 10/692,442, filed Oct. 23, 2003, which is a continuation-in-part of patent application Ser. No. 10/280,446, filed Oct. 25, 2002 now U.S. Pat. No. 7,125,077.

FIELD OF THE INVENTION

The present invention relates to machine foundations, and more particularly, an apparatus for isolating and leveling a machine foundation with respect to a substructure, wherein the natural frequency of the apparatus is adjustable.

BACKGROUND OF THE INVENTION

When installing and setting up heavy-duty industrial machinery (i.e., machinery, equipment, presses, etc.), it is difficult to properly isolate a machine from the substructure (i.e., floor, ground, etc.) of a building or facility or from the ground or soil of the earth. Such isolation may be desired to isolate vibration from a machine that is sensitive to vibration, as in the case of a magnetic resonance imaging (MRI) machine. In the alternative, such isolation may be required to isolate the vibration created by a machine from a substructure. The shock and vibration generated or realized by these machines may create misalignments of the machine due to the forces and the settling of the substructure or the machine's foundation. Proper alignment, including leveling, flatness, and the like, is essential in order to operate the machinery efficiently, economically and safely.

Prior designs have attempted to isolate a machine foundation from a substructure by providing a concrete well in the substructure. Sand or other fill materials line the walls of the concrete well and create a barrier between the machine's concrete foundation and the substructure. Springs have also been utilized between the substructure and the machine's concrete foundation to isolate and support the machine foundation from the substructure. However, these designs do not provide a method or apparatus for easily and effectively leveling the machine.

Other past designs have utilized machine foundations that are integral with a substructure. Although some of these designs have provided leveling mechanisms between the machine and the foundation, the design of the machine foundation and the substructure must be completely re-engineered when replacing the existing industrial machinery. Re-engineering a machine foundation and a substructure is a costly proposition that is undesirable in the field of industrial machinery.

Larger seismic events, such as earthquakes or large loads applied to the machine foundation, may cause the machine foundation to move or shift with respect to the substructure. When this occurs, leveling and isolating mechanisms between the machine foundation and substructure may be damaged. This may require replacement of the machine foundation which is a costly operation.

Where a plurality of leveling and isolating mechanisms support the machine foundation with respect to the substructure, significant variations in the natural frequencies of the individual mechanisms are detrimental to the efficiency of the system. Prior designs have not provided a method or apparatus for easily and effectively leveling a machine foundation while independently adjusting the natural frequency of the apparatus.

Thus, it would be desirable to provide an apparatus for isolating and leveling a machine foundation with respect to a substructure. It would also be desirable to have an apparatus for isolating and leveling a machine foundation wherein the apparatus and foundation could be reused with respect to a replacement machine. In addition, it would be desirable to provide an apparatus that could limit the movement and distribute the load of a machine foundation that moves with respect to a substructure in response to a seismic event. It would also be desirable to provide an apparatus wherein the natural frequency of the apparatus is adjustable independent of the machine foundation elevation.

SUMMARY OF THE INVENTION

The present invention provides an apparatus for isolating a machine foundation from a substructure of a building while also providing proper adjustments to level the machine foundation and to adjust the natural frequency of the apparatus. The apparatus of the present invention provides an enclosure connected to the machine foundation wherein the enclosure has an upper portion and a lower portion that are telescopically adjustable to one another to allow for various sizes of the enclosure and provide a leveling adjustment of the machine foundation. A bearing member is disposed within the enclosure and is adjustably connected to the enclosure. A primary support member is positioned between the bearing member and the substructure for isolating the machine foundation from the substructure. Additionally, a secondary support member is positioned between the bearing member and the substructure for isolating the machine foundation from the substructure and allowing adjustment of the natural frequency of the apparatus.

The apparatus may include a base plate that is engageable with the substructure and abuts the primary and secondary support members. The base plate includes a retainer base that is engageable with the secondary support member for limiting the movement of the secondary support member with respect to the base plate. Furthermore, the bearing member may be slidably connected to the base plate by a pair of rods that extend from the base plate through corresponding apertures in the bearing member.

The apparatus also includes an adjustment member for adjustably distributing the force applied to the primary and secondary support members. The adjustment member includes a retainer cap that is engageable with the secondary support member. An adjustment rod is adjustably connected to the bearing member and engageable with the retainer cap to allow adjustment of the distance between the bearing member and the retainer cap to thereby change the natural frequency of the apparatus.

BRIEF DESCRIPTION OF THE DRAWINGS

The description herein makes reference to the accompanying drawings, wherein like reference numerals refer to like parts throughout several views and wherein.

DESCRIPTION OF THE PREFERRED EMBODIMENT

Figure 1:
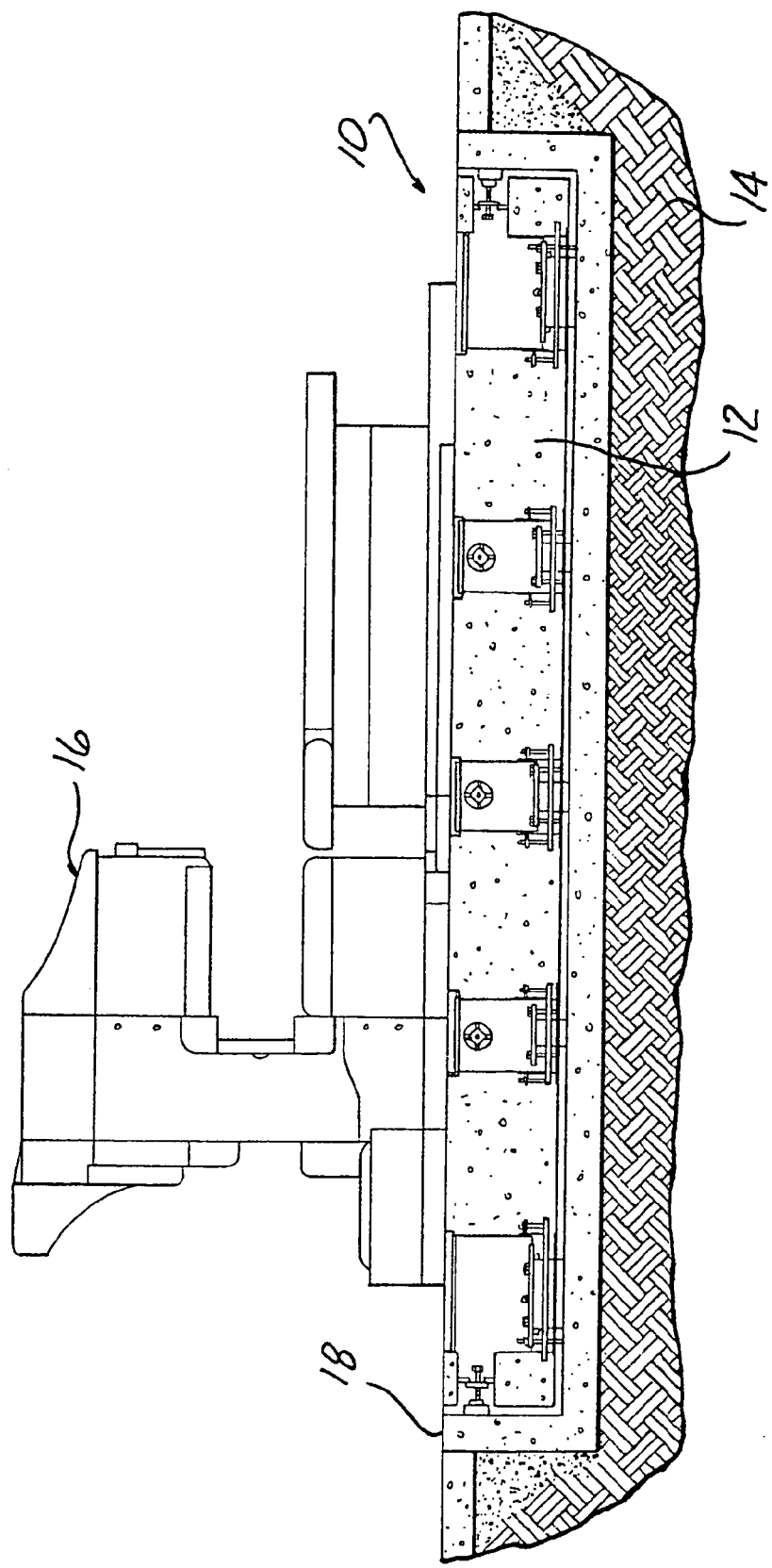
FIG. 1 is a sectional view showing the apparatus of the present invention being utilized to isolate and level the foundation of a MRI machine.

Referring to the drawings, the present invention will now be described in detail with reference to the disclosed embodiments.

FIGS. 1-5 illustrate the apparatus 10 of the present invention for isolating and leveling a machine foundation 12 with respect to a substructure 14 of a building (not shown) or the ground. As seen in FIG. 1, the apparatus 10 of the present invention may be used to isolate and level the machine foundation 12 of a machine 16. The apparatus 10 may be utilized to isolate the vibration of a machine 16 from the substructure 14, or the apparatus 10 may isolate the machine 16 from the vibration of the substructure 14 wherein the machine 16 is sensitive to vibration, such as in the case of a magnetic resonance imaging (MRI) machine installed in a hospital. The application of the present invention is not limited to MRI machines 16, but rather, any large industrial machine which requires the isolation of vibration and shockwaves and requires the leveling of a foundation may be utilized to isolate and level the machine foundation 12 from the substructure 14.

The machine 16 is typically installed within a building by providing a concrete well 18 in the substructure 14 of the building. The machine foundation 12 is fabricated from concrete wherein the footings of the machine 16 are set in the concrete machine foundation 12. A plurality of the apparatuses 10 of the present invention are set within the machine foundation 12 at strategically placed locations. For instance, the apparatuses 10 may be equally spaced within the machine foundation 12 and positioned at the corners of the machine foundation 12. The machine foundation 12 is placed within the concrete well 18 of the substructure 14, and a small space is created between the concrete well 18 and the machine foundation 12 by the apparatuses 10. The apparatuses 10 utilize support members 20 and isolating members 22 to separate and isolate the machine foundation 12 from the substructure 14. By isolating the machine foundation 12 from the substructure 14, the apparatuses 10 provide a way to level the machine foundation 10 while also isolating vibration and shockwaves from the substructure 14.

Figure 2:
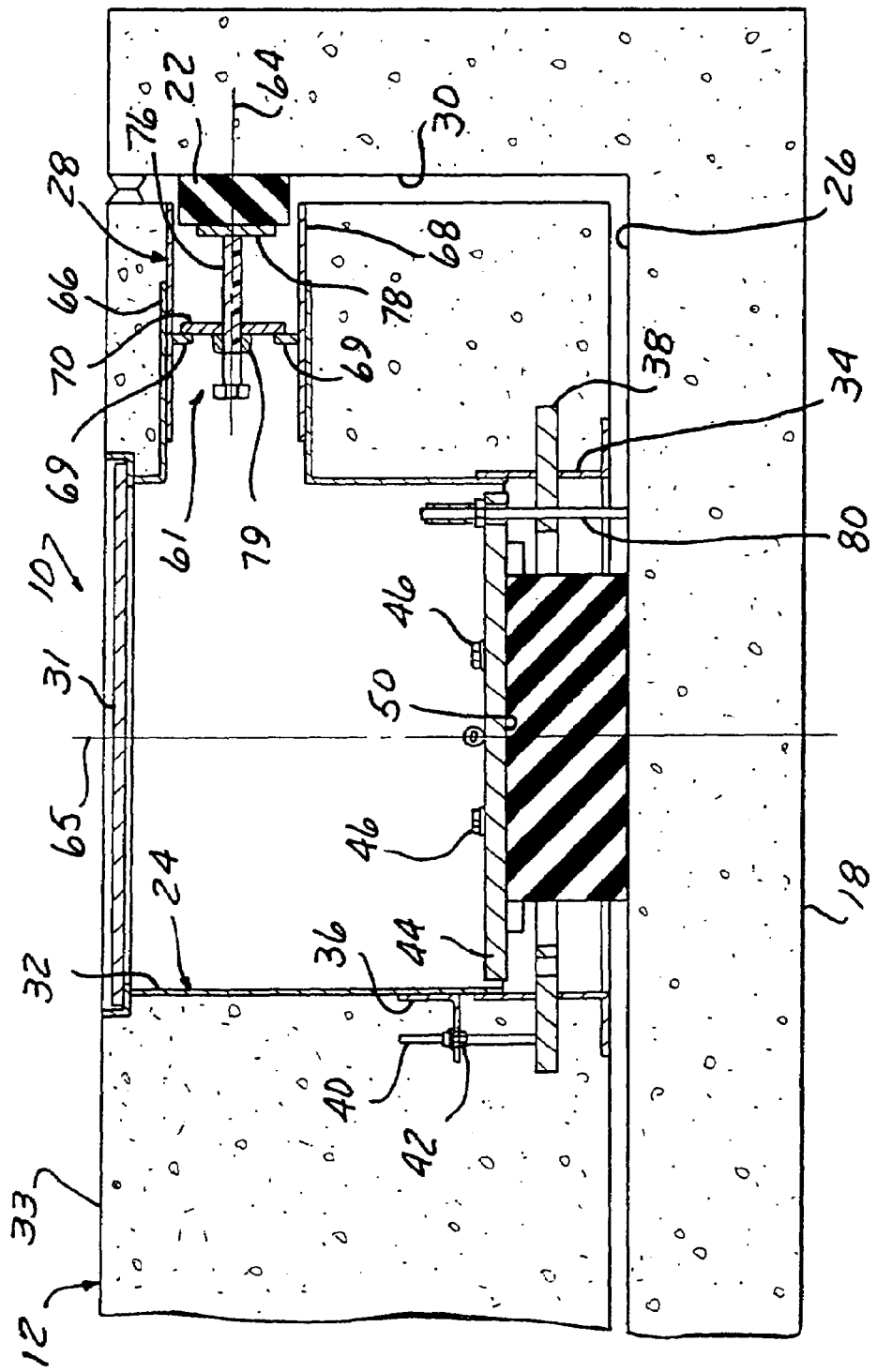
FIG. 2 is a cross-sectional view of the apparatus of the present invention taken in the direction of arrows 2-2 in FIG. 3.
Figure 4:
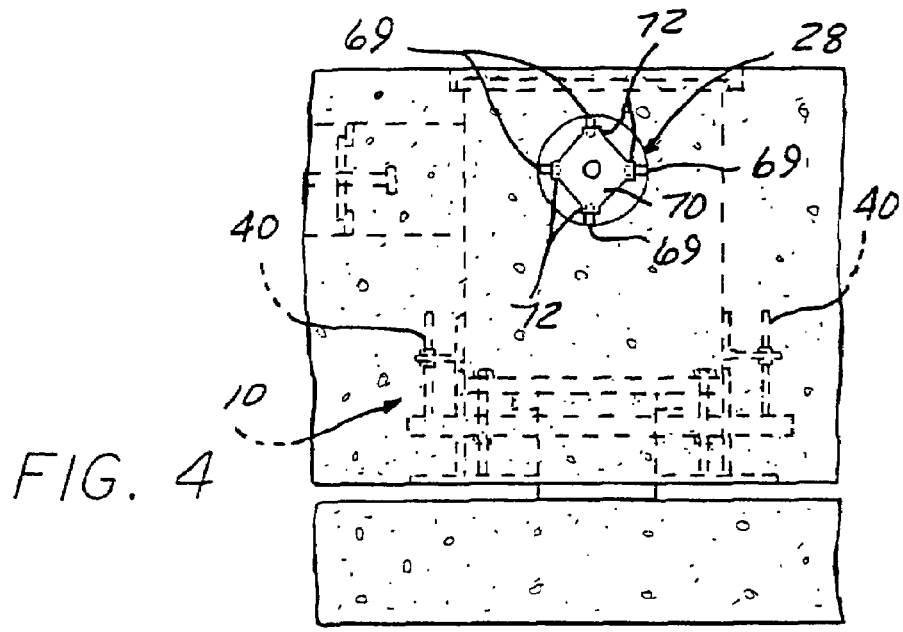
FIG. 4 is a top view of the apparatus of the present invention.
Figure 3:
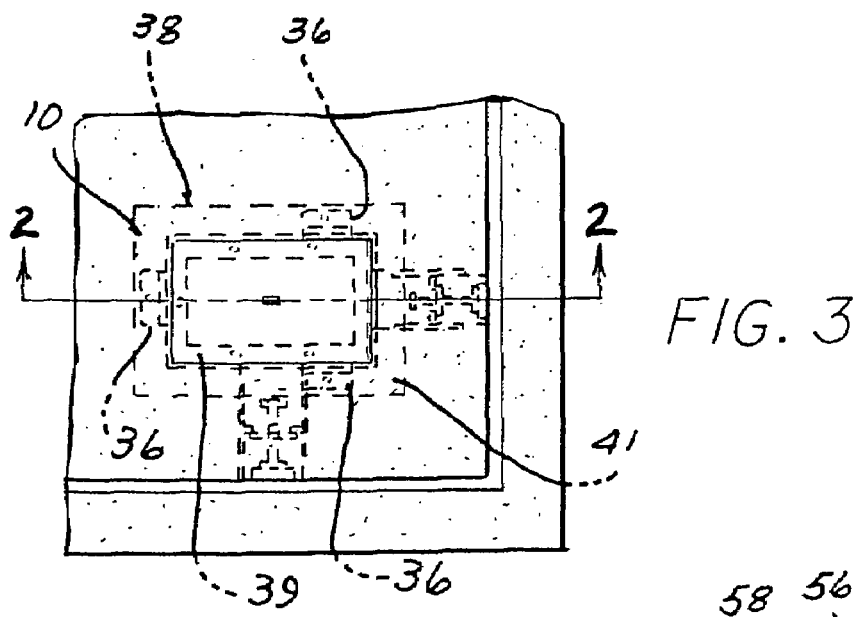
FIG. 3 is a cross-sectional view of the apparatus of the present invention taken in the direction of arrows 3-3 in FIG. 2.

As seen in FIGS. 2-4, the apparatus 10 of the present invention provides a substantially rectangular enclosure 24 that is set within the concrete of the machine foundation 12 and extends the entire depth or height of the machine foundation 12. The enclosure 24 may also provide two cylindrical passageways or outlets 28 in the sides of the enclosure 24 that provide access to sidewalls 30 of the substructure 14. It should be noted that the present invention is not limited to the enclosure 24 being substantially rectangular, but rather, the enclosure 24 may be constructed in any geometric configuration that will allow for the proper isolation and leveling of the machine foundation 12. In addition, the enclosure 24 may be fabricated from various materials. However, if the apparatus 10 is used in conjunction with a MRI machine, then a non-ferrous alloy, such as aluminum, should be utilized to construct the enclosure 24 so that the enclosure 24 will not affect the operation of the MRI machine 16. A removable cover 31 covers the top of the enclosure 24 and is recessed just below the top surface 33 of the machine foundation 12. The cover 31 should also be fabricated from a non-ferrous alloy if used in conjunction with an MRI machine.

In order to adjust the depth or height of the enclosure 24 to correspond to the depth or height of the machine foundation 12, the enclosure 24 has an upper portion 32 and a lower portion 34 that are telescopically received within one another. Specifically, the upper portion 32 of the enclosure 24 is telescopically received within the lower portion 34 of the enclosure 24. The upper portion 32 and the lower portion 34 of the enclosure 24 are adjustably connected through the use of three substantially right angle flanges 36 that are connected to and extend outward from the exterior of the upper portion 32 of the enclosure 24. The flanges 36 each have an aperture extending through the outwardly extending portion of the flange 36. The flanges 36 are equally spaced about the outer perimeter of the enclosure 24. The lower portion 34 of the enclosure 24 has an anchor ring 38 integrally connected to the lower portion 34 of the enclosure 24. The anchor ring 38 has an inner perimeter 39 and an outer perimeter 41 relative to the enclosure 24 that both extend at a substantially right angle from the lower portion 34 of the enclosure 24. Three rods 40 are integrally connected to the anchor ring 38 and extend upward toward the flanges 36 of the upper portion 32 of the enclosure 24. The three rods 40 correspond in location and number to the apertures in the flanges 36 of the enclosure 24. The rods 40 extend through the apertures provided in the flanges 36, and three adjustable slip joints 42, connected to each of the flanges 36, receive and engage the rods 40. The adjustable slip joints 42 provide a releasable locking mechanism that releaseably locks the rods 40 within the adjustable slip joints 42 and allows the upper portion 32 and the lower portion 34 of the enclosure 24 to telescopically move relative to one another to provide for the desired height of the enclosure 24.

To apply the load of the machine 16 and the machine foundation 12 to the support member 20, the apparatus 10 of the present invention provides a load bearing member 44. The load bearing member 44 is a substantially flat, plate-like structure disposed within the enclosure 24. Four threaded fasteners 46 connect the bearing member 44 to the inner perimeter 39 of the anchor ring 38. The threaded fasteners 46 can be adjusted to adjust the distance between the bearing member 44 and the anchor ring 38, thereby adjusting the load applied to the support member 20 and the distance between the machine foundation 12 and a floor 26 of the substructure 14. However, the bearing member 44 can only be lowered to a point in which the upper portion 32 of the enclosure 24 bottoms out or engages the anchor ring 38. This prevents the overloading of the support member 20. It should be noted that the present invention anticipates other means of adjusting the distance between the bearing member 44 and the anchor ring 38 beside the fasteners 46. For instance, hydraulic jacks may be utilized to adjust the height of the bearing member 44.

The load of the bearing member 44 is applied to the support member 20 by having the support member 20 positioned between and in contact with a bottom surface 50 of the bearing member 44 and the floor 26 of the substructure 14. The support member 20 may be a substantially rectangular block of rubber material that allows for a certain amount of compressibility. This compressibility not only isolates the vibration and shock of the machine foundation 12 from the substructure 14, but also allows for the adjustment of the fasteners 46 so as to level the machine 16 and its foundation 12. The fasteners 46 can also adjust the vertical stiffness of the machine foundation 12 by compressing the support members 20 more to increase the stiffness and less to reduce the stiffness of the machine foundation 12. Although the apparatus 10 of the present invention and the application thereof described may be best suited for a support member 20 fabricated from a rubber material, the present invention is not limited to the support member 20 being fabricated from a rubber material. The support member 20 may be fabricated from various springs, such as steel springs, or air bags. If the isolation of vibration is not a concern, then the support member 20 may be fabricated from a solid steel block in order to provide a more stable material for leveling the machine foundation 12.

Figure 5:
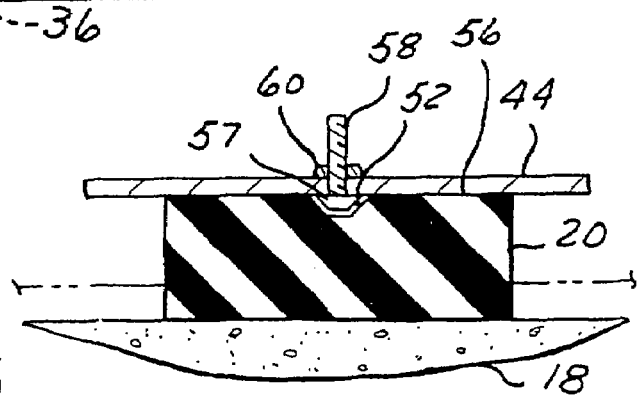
FIG. 5 is a breakaway sectional view of an alternative embodiment of the resilient member and bearing member of the present invention.

In an alternative embodiment, the structure of the support member 20 may be modified in order to stabilize the support member 20 by reducing the amount of horizontal movement of the support member 20. As seen in FIG. 5, the support member 20 provides a recess formed in substantially the center of a top surface 56 of the support member 20. The recess 52 may have a frusto-conical shape extending downward into the top surface 56 of the support member 20. A complementarily engaging structure 57 is connected to the bottom surface 50 of the bearing member 44 through the use of a threaded fastener 58. The complementarily engaging member 57 is connected to the end of a threaded fastener 58. The threaded fastener extends through an aperture provided in the bearing member 44 and is secured to the bearing member 44 by the use of a threaded nut 60. The complementarily engaging member 57 has a frusto-conical shape which matingly engages the recess 52 provided in the top surface 56 of the support member 20. As the load is applied through the bearing member 44 to the support member 20, the complementarily engaging member 57 works to reduce the amount of horizontal movement of the support member 20. The complementarily engaging member 57 may be fabricated from a rubber material similar to the support member 20 or may be fabricated from any other substantially high strength material.

The apparatus 10 of the present invention may also provide horizontal stabilizers 61 in order to stabilize the machine foundation 12 in a horizontal direction while also providing a stiffness adjustment along the horizontal or Y axis. In order to utilize the horizontal stabilizers 61, the enclosure 24 is located relatively close to one of the sidewalls 30 of the substructure 14 so that the horizontal stabilizer 61 can engage the sidewall 30 of the substructure 14. In addition, if the enclosure 24 is located within a corner of the machine foundation 12, the horizontal stabilizer 61 may be utilized on adjacent sidewalls 30 of the substructure 14, as seen in FIG. 4.

As seen in FIGS. 2-4, the horizontal stabilizer 61 is disposed within the outlet or passageway 28 of the enclosure 24. Since the horizontal stabilizer 61 engages the sidewalls 30 of the substructure 14, the passageway 28 of the enclosure 24 has a longitudinal axis 64 that is substantially perpendicular to a vertical, longitudinal axis 65 of the enclosure 24. The passageway 28 of the enclosure 24 is substantially cylindrical and provides an inner portion 66 and an outer portion 68 that are telescopically adjustable so that the length of the passageway 28 may be adjusted to correspond to the length of the machine foundation 12 that extends between the enclosure 24 and an end of the machine foundation 12. The inner portion 66 and the outer portion 68 of the passageway 28 have a slip joint feature that allows for easy telescopic adjustment of the inner portion 66 and the outer portion 68. The telescopic arrangement of the passageway 28 is such that the outer portion 68 has a segment that is inside a segment of the inner portion 66 of the passageway 28. It should be noted that the invention is not limited to a cylindrical passageway 28, but rather, the passageway 28 may utilize any geometry that provides for a horizontal stabilizer 61, as described in the present invention.

In order to horizontally stabilize the machine foundation 12, four substantially rectangular tabs 69 extend radially inward from the inner circumference of the outer portion 68 of the passageway 28. The four tabs 69 are spaced substantially 90° from one another. An anchor plate 70 has a substantially diamond configuration with four fingers 72 corresponding in position to the tabs 69 in the outer portion 68 of the passageway 28. The anchor plate 70 provides a "twist lock" feature by having the four fingers 72 of the anchor plate 70 engage the tabs 69 on the outer portion 68 of the passageway 28 in a specific configuration. When the anchor plate 70 is rotated 45°, the four fingers 72 of the anchor plate 70 disengage the tabs 69 of the outer portion 68 of the passageway 28. The anchor plate 70 provides a threaded aperture for threadably receiving a bolt or rod 76, and a substantially cylindrical isolator plate 78 is connected to the end of the rod 76. The isolating member 22 also has a substantially cylindrical configuration and is positioned between and in contact with the isolator plate 78 and the sidewall 30 of the substructure 14. The rod 76 may be threadably adjusted with respect to the anchor plate 70 so that the amount of preload applied to the isolating member 22 by the isolator plate 78 may be adjusted by adjusting the length of the rod 76. Threaded nut 79 secures the rod 76 in a predetermined position. The isolating member 22 is fabricated from a rubber material, but the isolating member 22 may also be fabricated from a spring or air bag.

Figure 6:
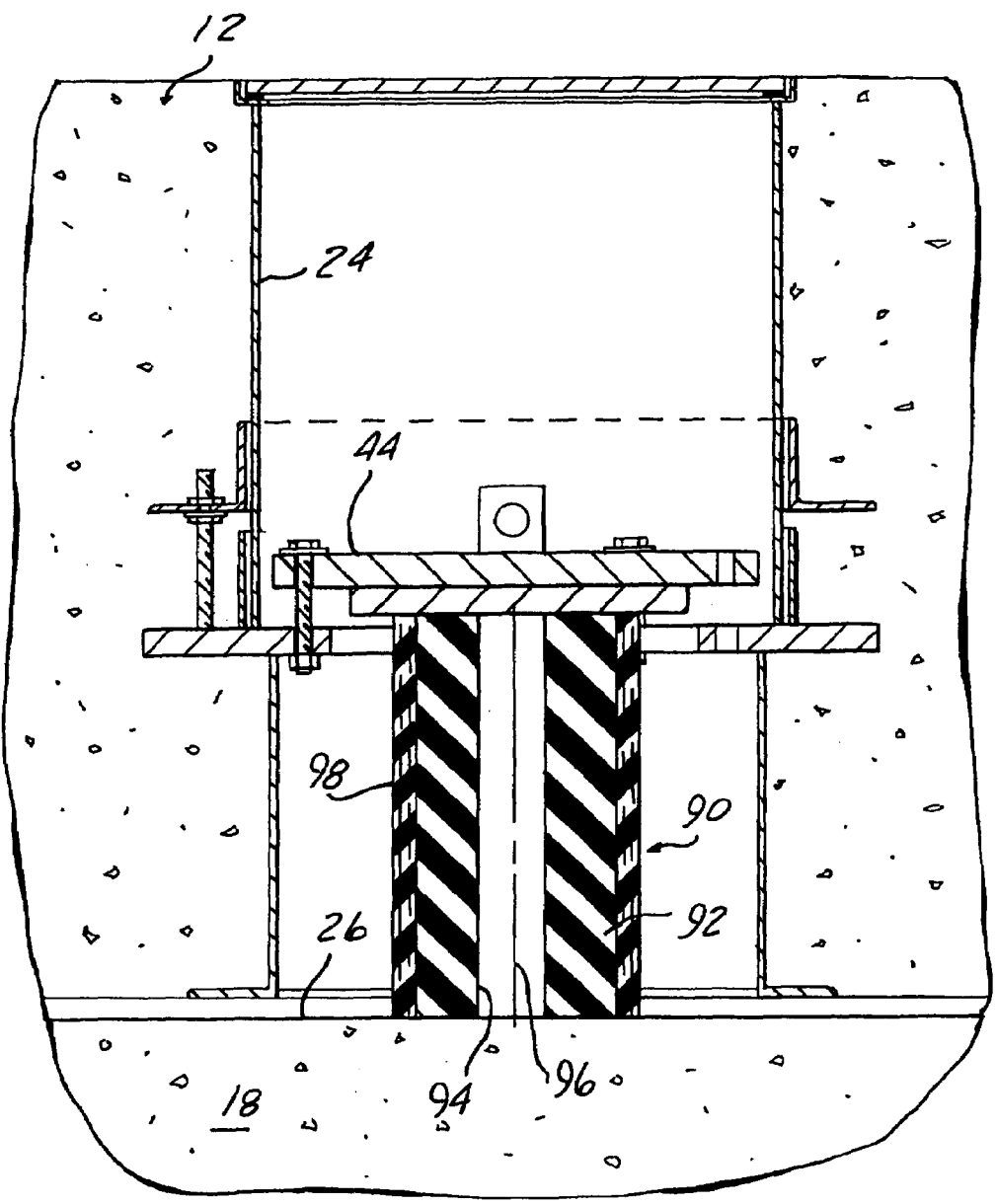
FIG. 6 is a sectional view showing the support member of the present invention as an elastomeric inner core with elastomer-coated cords overlapping the inner core.

In an alternative embodiment, the support member 20 may include a substantially cylindrical elastomeric member 90 that extends between the bearing member 44 and the floor 26 of the concrete well 18, as seen in FIG. 6. The cylindrical member 90 provides a substantially cylindrical inner core 92 fabricated from an elastomeric material, such as rubber. The inner core 92 has a throughbore 94 coaxially aligned with a longitudinal axis 96 of the cylindrical member 90. The throughbore 94 allows the inner core 92 to expand into the bore 94 of the cylindrical member 90 upon the realization of compressive forces along the longitudinal axis 96. The cylindrical member 90 also provides an outer layer of elastomer-coated cords 98 that overlap the inner core 92. The elastomer-coated cords 98 are spirally wound about the inner core 92 and are integrally bonded layer-to-layer to the inner core 92 wherein each layer of the elastomer-coated cords 98 are substantially parallel to one another and extend at an angle to the longitudinal axis 96 of the inner core 92. The elastomer-coated cords 98 resist radial expansion of the inner core 92 in response to compressive forces along the longitudinal axis 96 of the elastomeric member 90. The height of the cylindrical member 90 is such that the inner core 92 and the outer cords 98 have a height to width ratio of approximately 2:1 in an unstressed condition.

Figure 7:
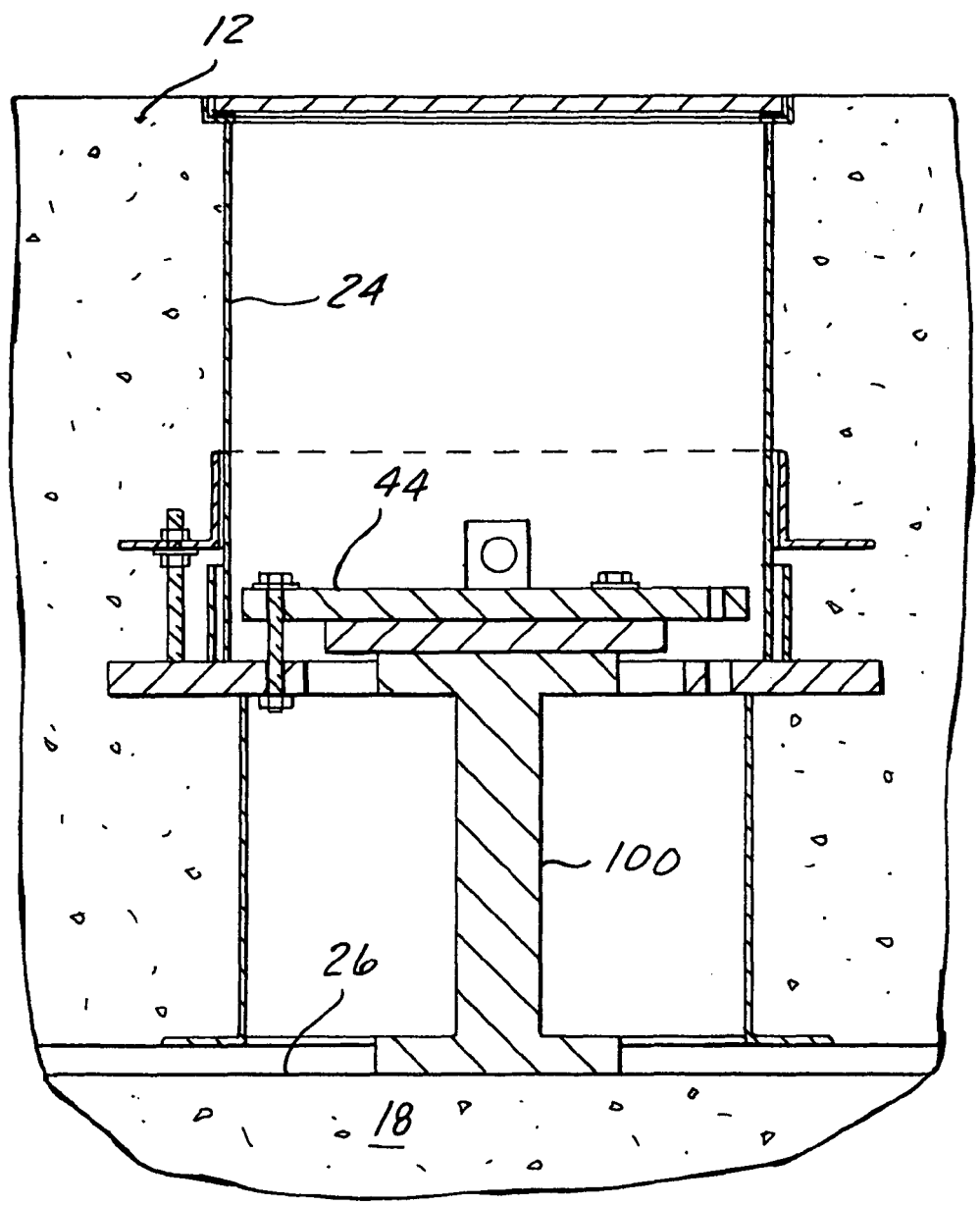
FIG. 7 is a sectional view showing the support member of the present invention as a steel I-beam.

In yet another embodiment of the present invention, the support member 20 may be fabricated from a high-strength, rigid material, such as a steel I-beam 100, as seen in FIG. 7. The high-strength, rigid support member 100 is adaptable to be removably disposed between the bearing member 44 and the floor 26 of the concrete well 18 so that the rigid support member 100 may be replaced with other support members (not shown) should the need arise. The high-strength, rigid support member 100 may be utilized to support the weight of the machine foundation 12 wherein the isolation of vibration from the machine foundation 12 is not desired. Although vibrations from the machine foundation may not be isolated, the apparatus 10 of the present invention may still be utilized to provide the benefits of leveling the machine foundation 12.

Figure 8:
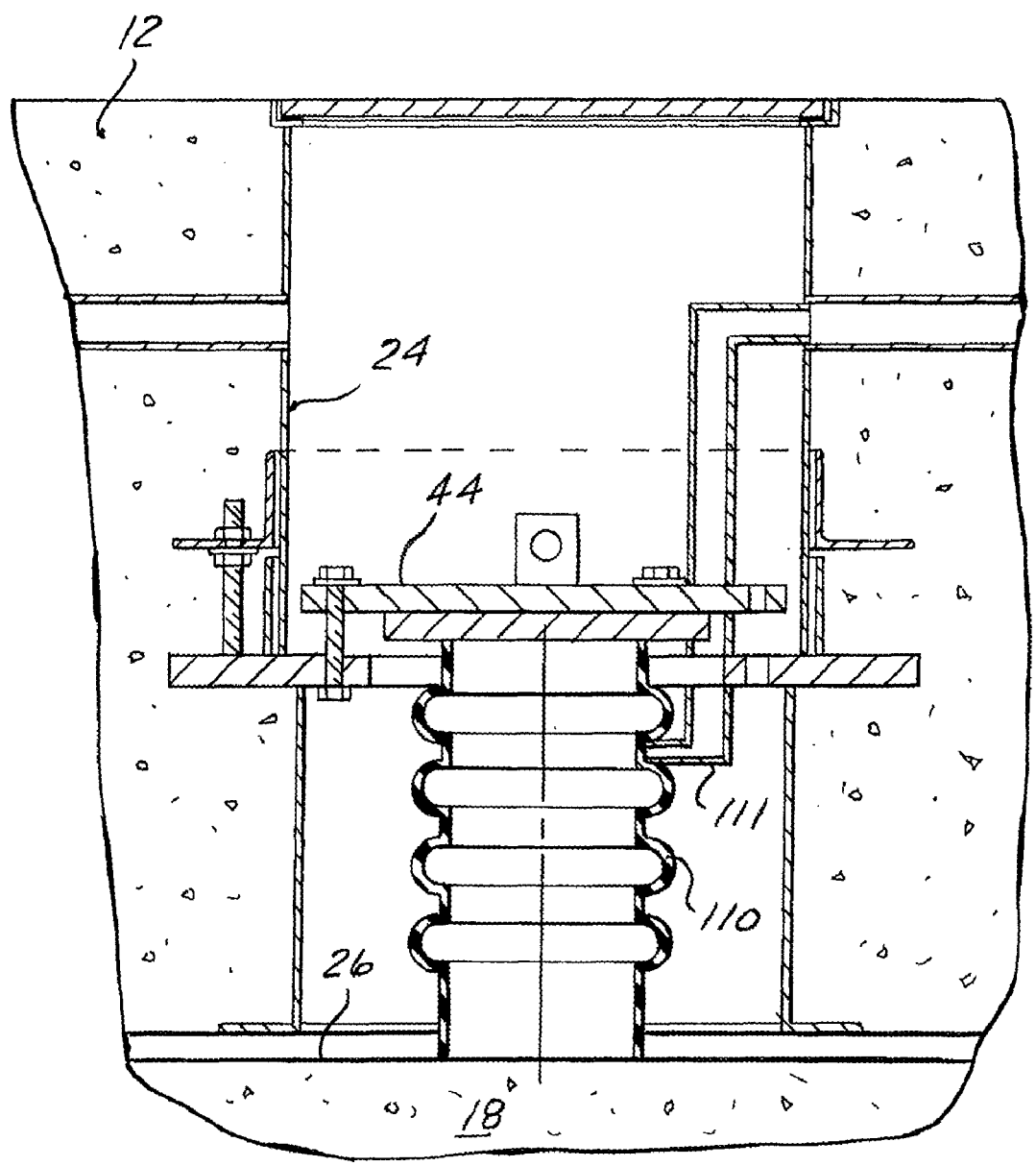
FIG. 8 is a sectional view showing the support member of the present invention as an inflatable air bag.

In even yet another embodiment, the support member 20 of the present invention may include an adjustable air bag or bellows 110, as shown in FIG. 8. The air bag 110 is sealably mounted to the bearing member 44 and the floor 26 of the concrete well 18 and is in communication with a conduit 112 for communicating pressurized air to and from the air bag 110. The conduit 112 extends from the air bag 110, through the housing 24, and into the machine foundation 12 wherein the conduit 112 communicates with a pressurized air source (not shown). Pressurized air may be supplied to and from the air bag 110 to provide an adjustable amount of pressure to the bearing member 44. A gauge (not shown) may also be utilized to monitor and determine the air pressure within the air bag 110.

In operation, the enclosure 24 is set within the concrete of the machine foundation 12. The apparatuses 10 of the present invention are placed in strategic locations within the machine foundation 12 in order to properly isolate vibration from the machine foundation 12 to the substructure 14, as well as provide specific leveling adjustments to the machine foundation 12. In setting the enclosures 24 within the concrete of the machine foundation 12, the length of the enclosure 24 must be properly adjusted for the height or depth of the machine foundation 12 by adjusting the upper portion 32 and the lower portion 34 of the enclosure 24 through the use of the adjustable slip joint 42. Once the enclosures 24 are set in the machine foundation 12, the machine foundation 12 is placed in the concrete well 18 of the substructure 14. The support member 20 is placed on the bottom of the enclosure 24, and the bearing member 44 is secured to the anchor ring 38 through the use of the fasteners 46. The fasteners 46 are tightened until a sufficient load is applied to the support member 20 such that the machine foundation 12 lifts off the floor 26 of the substructure 14. Gauges or gauge pins 80 may be installed through corresponding apertures in the bearing member 44 and the anchor ring 38. The gauges 80 extend to the floor 26 of the substructure 14 to determine the distance between the bearing member 44 and the floor 26 of the substructure 14. The gauges 80 provide the user with an indication as to whether the machine foundation 12 is level. By reading the gauges 80 from all of the apparatuses 10 in the machine foundation 12, proper adjustments may be made to the fasteners 46 in the bearing member 44 and the anchor ring 38 by lowering or raising certain areas of the machine foundation 12 so as to properly level the machine foundation 12. In addition, the stiffness of the machine foundation 12 along the vertical axis 65 may be adjusted by compacting the support member 20 further if greater stiffness is desired and reducing the amount of compactness of the support member 20 if less stiffness is desired. The natural frequency of the machine foundation 12 can also be altered by adjusting the amount of vertical stiffness in the support member 20 or varying the amount of vertical stiffness among the various resilient members.

After the proper adjustments are made to the bearing member 44, the horizontal stabilizers 61 may be installed. The rod 76 along with the anchor plate 70 and isolator plate 78 are inserted into the passageway 28 of the enclosure 24. The isolating member 22 is positioned between the isolator plate 78 and the sidewall 30 of the substructure 14. The anchor plate 70 is inserted such that the four fingers 72 of the anchor plate 70 do not engage the tabs 69 located in the outer portion 28 of the passageway 28. Force is applied to the anchor bolt 70 so as to preload the isolating member 22. A sufficient amount of deformation of the isolating member 22 must occur to allow the anchor plate 70 to extend beneath the tabs 69 in the outer portion 68 of the passageway 28 in a locked position. The anchor plate 70 is then rotated 45° so that the four fingers 72 of the anchor plate 70 may engage the tabs 69 in the outer portion 68 of the passageway 28. The bias from the isolating member 22 forces the anchor plate 70 against the tabs 69 so that a preload is applied and maintained against the sidewall 30 of the substructure 14. The horizontal stiffness of the machine foundation 12 may be adjusted by threadably adjusting the length of the rod 76. If a greater amount of horizontal stiffness is desired, the rod 76 is threaded outward toward the sidewall 30 of the substructure 14 such that the isolator plate 78 deflects or deforms the isolating member 22 to a greater degree. If a lesser amount of horizontal stiffness is desired, the rod 76 is threaded inward toward the enclosure 24 such that the isolator plate 70 decreases the amount of deflection or deformation to the isolating member 22.

If the machine 16 is replaced with another machine (not shown), the machine foundation 12 and the apparatuses 10 may be utilized in conjunction with the new machine. The old machine 16 is removed from the machine foundation 12, and the new machine is set within the machine foundation. Depending on the length of time the apparatuses 10 have been in use, the support members 20 may need to be replaced with new support members (not shown) fabricated from the same or different materials as the previous support members 20, depending on the application. The set up for the new machine is the same procedure as noted above.

Figure 9:
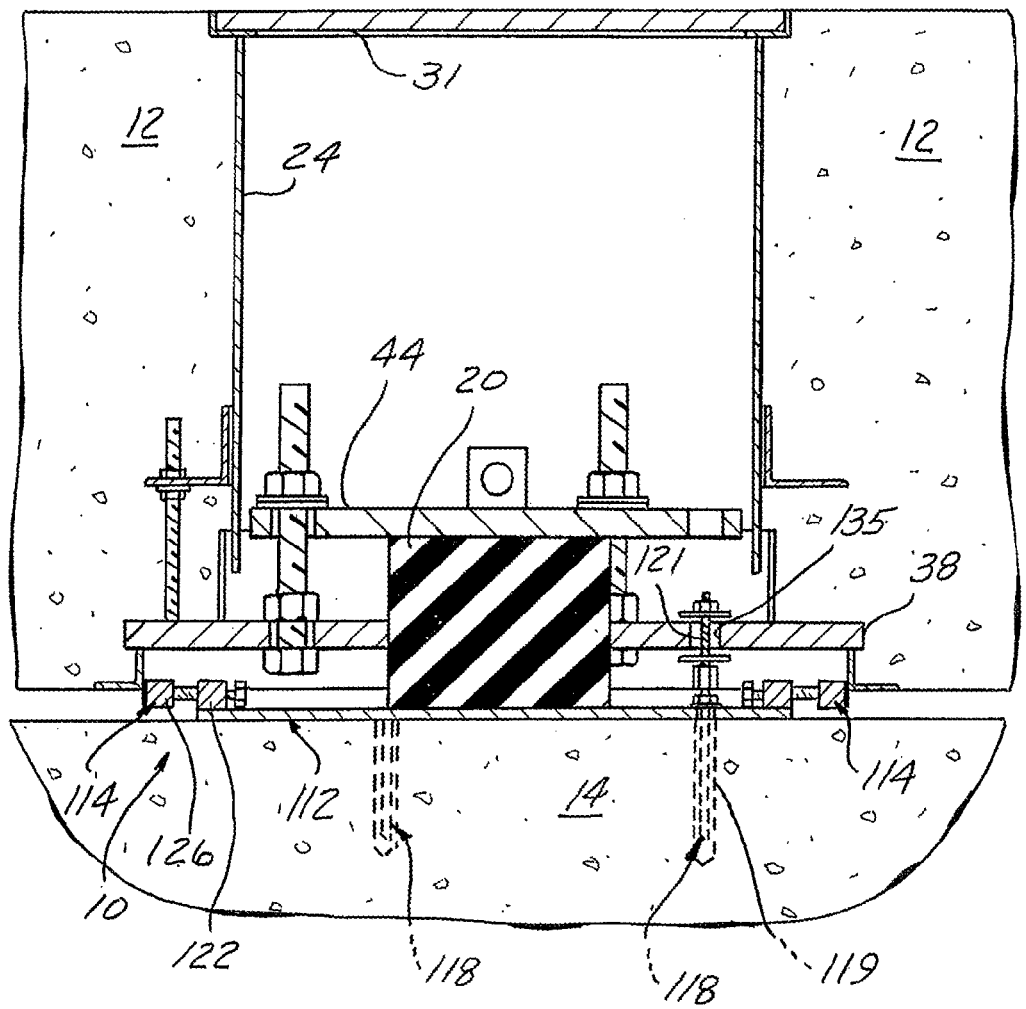
FIG. 9 is a sectional view showing the seismic restraint apparatus of the present invention.
Figure 12A:
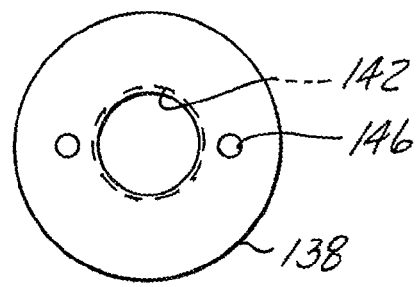
FIGS. 12A and 12B are a top and sectional view, respectively, of the seismic restraint apparatus of the present invention.
Figure 12B:
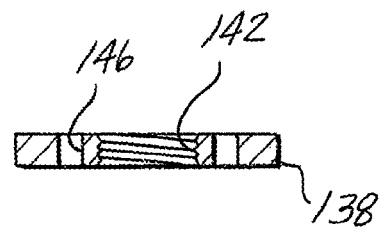
Figure 10:
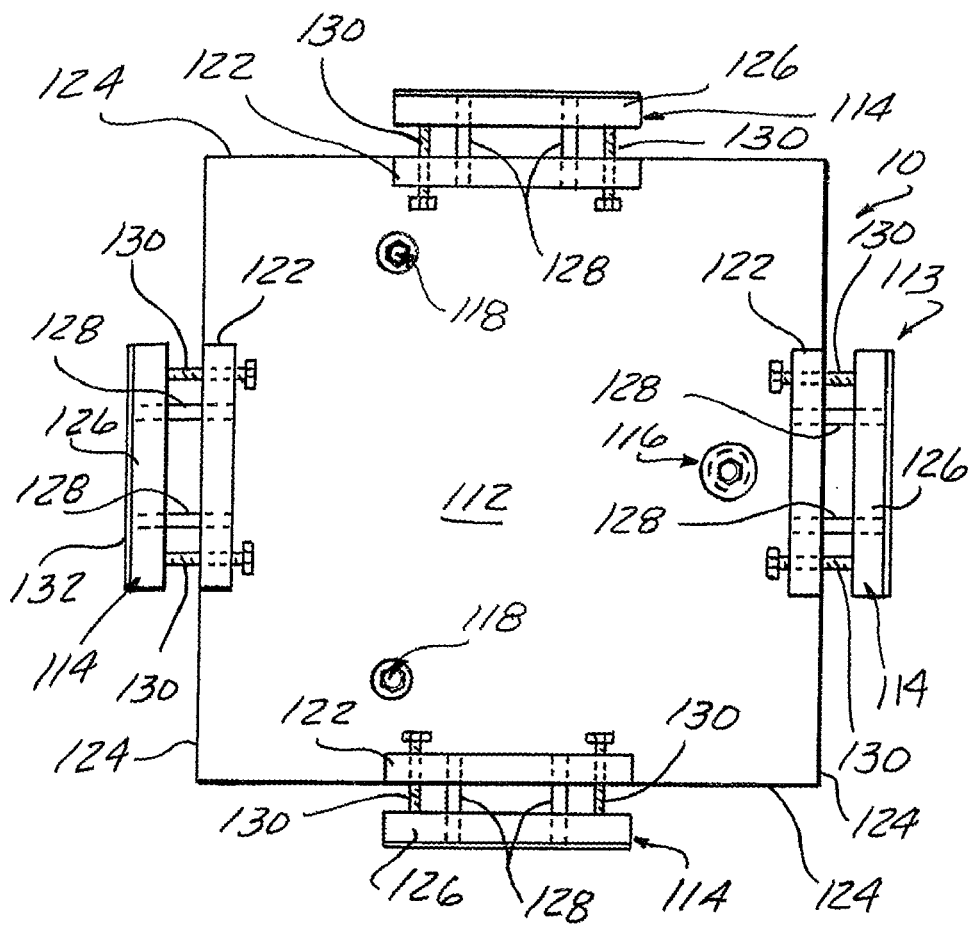
FIG. 10 is a top view of the seismic restraint apparatus of the present invention.

FIGS. 9-12B illustrate a seismic restraint apparatus 100 of the present invention for limiting the movement of the machine foundation 12 with respect to the substructure 14 in response to a seismic event such as an earthquake or a large load applied to the machine foundation 12. The seismic restraining apparatus 100 includes an anchor plate 112 connected to the substructure 14. At least one restraint 113 is connected to the anchor plate 112 for limiting the movement of the machine foundation 12 and distributing a load from the machine foundation 12 to the substructure 14 in response to a seismic event. The restraints 113 may include a horizontal restraint 114 for limiting horizontal movement of the machine foundation 12 and distributing a horizontal load from the machine foundation 12 to the substructure 14 in response to a seismic event. In addition, the restraint 113 may also include a vertical restraint 116 which may limit the vertical movement of the machine foundation 12 as well as distribute a vertical load of the machine foundation 12 to the substructure 14 in response to a seismic event. As seen in FIG. 10, the seismic restraint apparatus 100 includes four horizontal restraints 114 which are mounted along sides 124 of the anchor plate 112. Although four horizontal restraints 114 are disclosed in the specification, the present invention is not limited to four horizontal restraints 114, but rather, the invention may encompass any number of horizontal restraints 114 which are needed to limit the horizontal movement of the machine foundation 12. The specification also discloses only one vertical restraint 116. The present invention is not limited to one vertical restraint 116, but rather, the present invention may encompass any number of vertical restraints 116 needed to limit the vertical movement and distribute the vertical load of the machine foundation 12 relative to the substructure 14.

Figure 11:
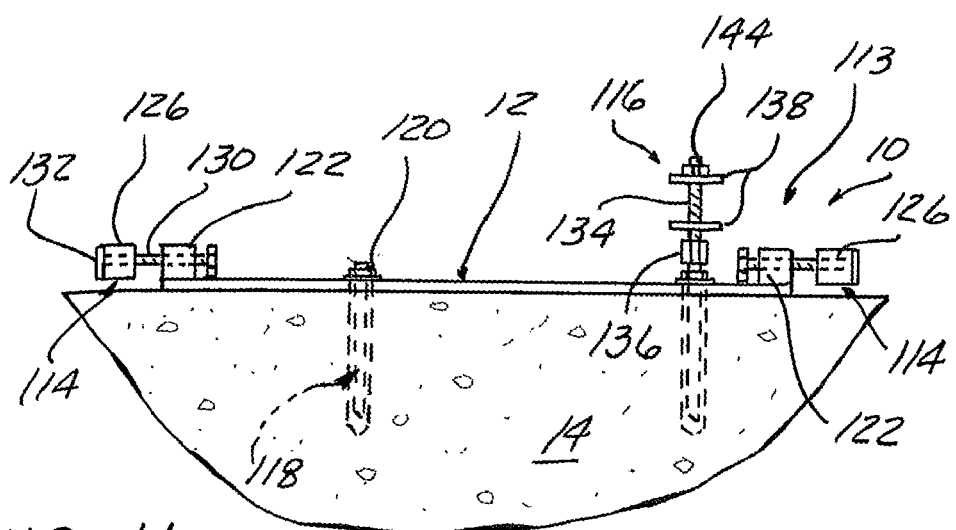
FIG. 11 is a side view of the seismic restraint apparatus of the present invention.

In order to secure the seismic restraint apparatus 100 to the substructure 14, the anchor plate 112 is fabricated from a substantially square plate of hardened steel. The anchor plate may be fabricated in any shape necessary to correspond with the leveling and isolating apparatus 10 of the present invention. The anchor plate 112 is secured to the substructure through the use of three capsule anchor bolts 118, as seen in FIGS. 9-11. The capsule anchor bolts 118 provide a capsule 119 is seated in an aperture provided in the substructure 114 and designed to receive the bolt portion 121 of the capsule anchor bolt 118. The present invention is not limited to three capsule anchor bolts 118, but rather, the present invention anticipates any number of capsule anchor bolts 118 required to secure the anchor plate 112 to the substructure 14. The anchor bolts 118 extend through corresponding apertures provided in the anchor plate 112 and thread into the capsules 119 of the capsule anchor bolts 118. A jam nut 120 secures the capsule anchor bolts 118 to the anchor plate 112.

To limit horizontal movement of the machine foundation 12 with respect to the substructure 14 in light of a seismic event, the horizontal restraints 114 provide a substantially rectangular restraint block 122 fabricated from a hardened steel. The restraint block 122 is welded to the sides 124 of the anchor plate 112 but may be secured to the anchor plate 112 in any conventional fashion. A similar, substantially rectangular stop rail 126 is connected to the restraint block 122 by dowel guide pins 128. The dowel guide pins 128 are received by corresponding apertures provided in both the restraint block 122 and the stop rail 126. The dowel guide pins 128 guide and stabilize the restraint block 122 relative to the stop rail 126. A pair of threaded bolts 130 may extend through threaded apertures provided in the restraint blocks 122 and the stop rail 126. The bolts 130 are threadably adjustable so as to provide adjustment to the position of the stop rail 126 relative to the restraint block 122. The present invention also anticipates that the bolts 130 may not be adjustable or not present such that the stop rail 126 is fixedly positioned with respect to the restraint block 122. The stop rail 126 may have an elastic bumper material 132 on the outside surface of the stop rail 126. The bumper material 132 is designed to engage the machine foundation 12 when moving in response to a seismic event.

In order to limit the vertical movement of the machine foundation 12 in response to a seismic event, the vertical restraint 116 provides a cylindrical member 134 that is connected to the top portion of the capsule anchor bolt 118 through the use of a connector nut 136. The substantially cylindrical member 134 has a threaded outer diameter for receiving a pair of stop plates 138. As seen in FIGS. 9-12B, the stop plates 138 are substantially circular and substantially parallel and provide a threaded aperture 142 therethrough for receiving the cylindrical member 134. The stop plates 138 are positioned along the cylindrical member 134 such that the cylindrical member 134 extends through an aperture 135 provided in the anchor ring, and the stop plates 138 are located on opposite sides of the anchor ring 38. A jam nut 144 is threaded onto the end of the cylindrical member 34 to secure the upper stop plate 138 in a predetermined position. The stop plates 138 may provide adjustment throughholes 146 to aid in the positioning of the stop plates 138.

In operation, the anchor plate 112 is placed onto the substructure 14 prior to the creation of the machine foundation 12. The anchor plate 112 is not secured to the substructure 14 at this time. The leveling and isolating apparatus 10 is placed on the substructure 14, and the desired clearances of the horizontal restraints 114 and the vertical restraints 116 are determined. The cement of the machine foundation 12 is then poured and allowed to cure. The anchor plate 112, the horizontal restraints 114, and the vertical restraints 116 are placed in proper position, and the anchor bolts 118 are installed to secure the anchor plate 112 to the substructure 14. The leveling and isolating apparatus 10 is properly adjusted, and the industrial machine is properly connected to the machine foundation 12.

Figure 13:
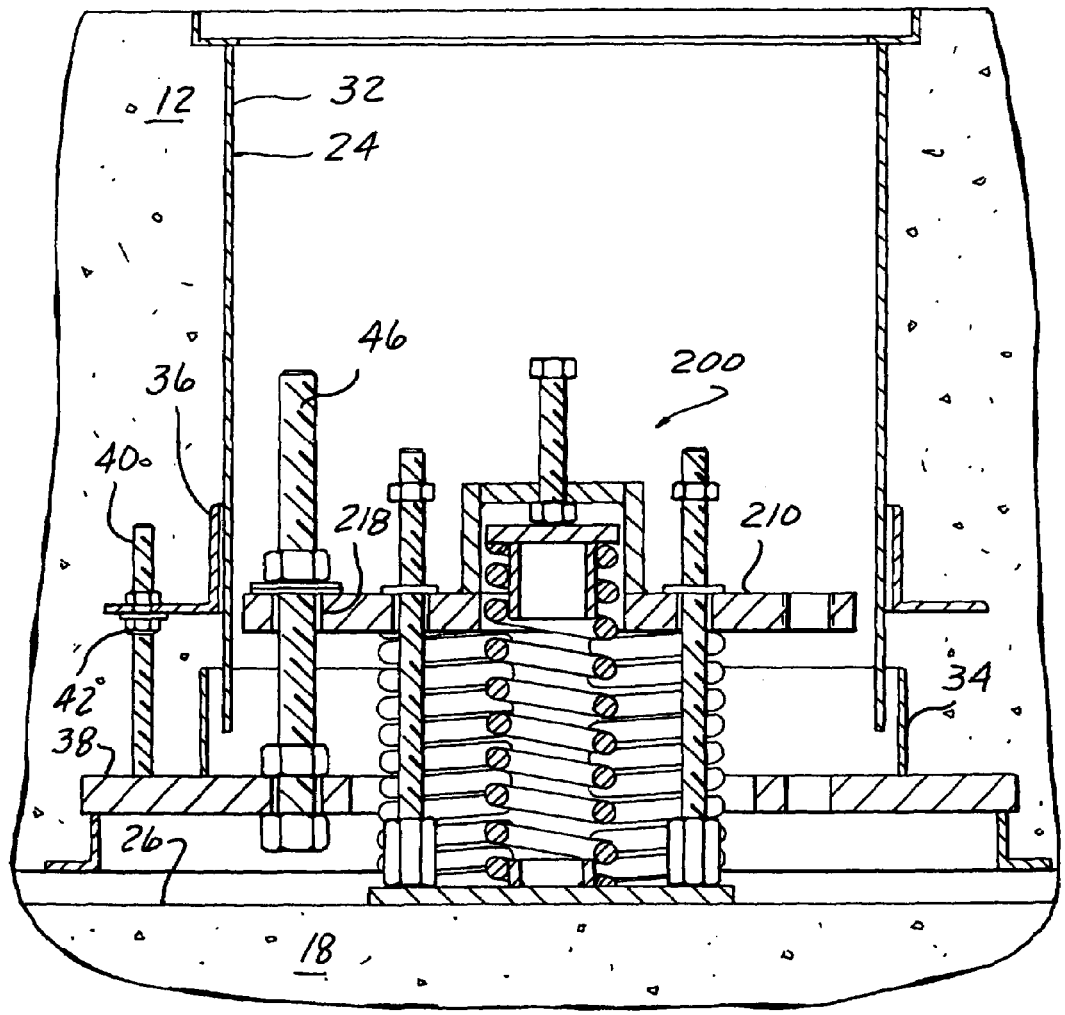
FIG. 13 is a cross-sectional view of the apparatus of the present invention having a frequency adjustable support assembly.
Figure 14:
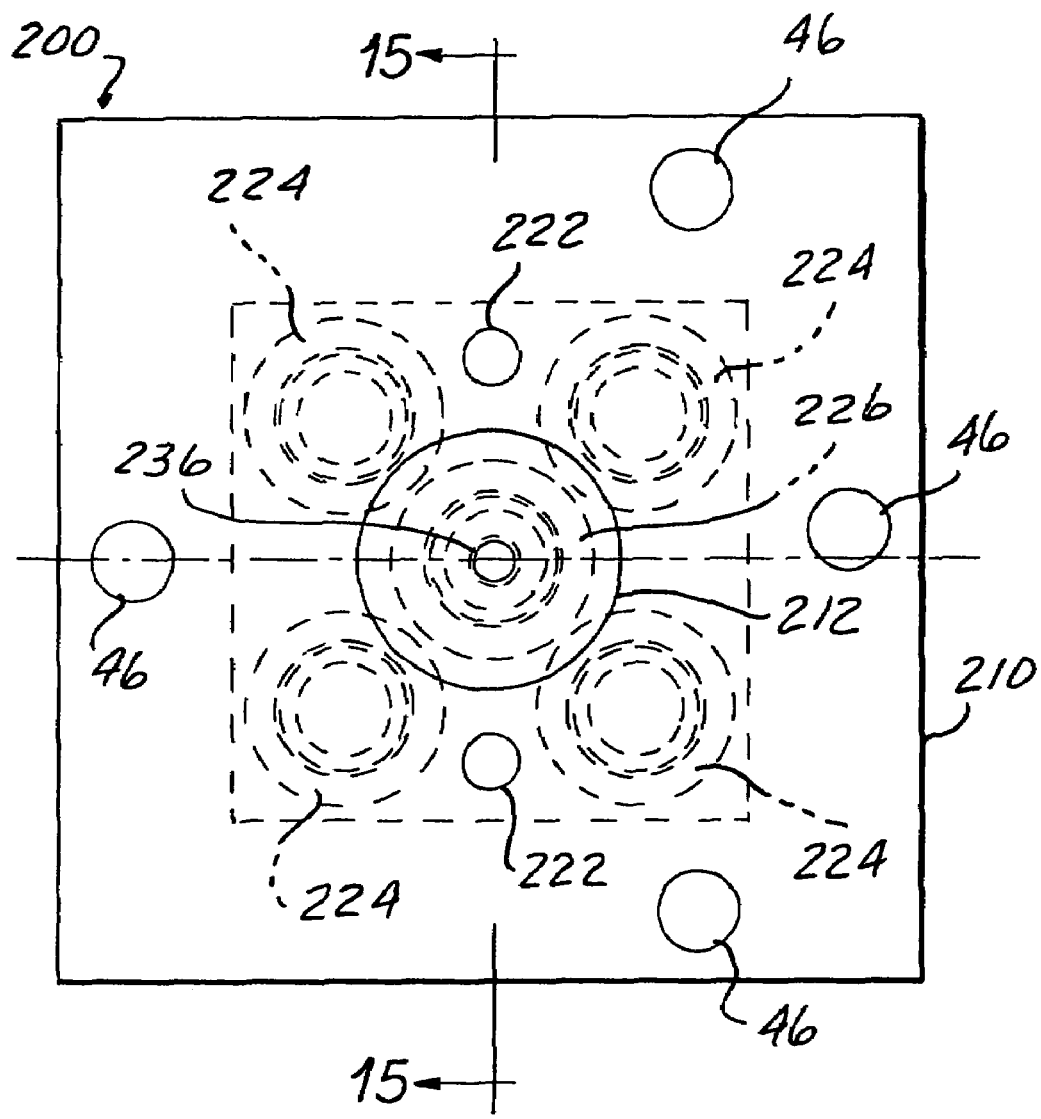
FIG. 14 is a top view showing the frequency adjustable support assembly.
Figure 15:
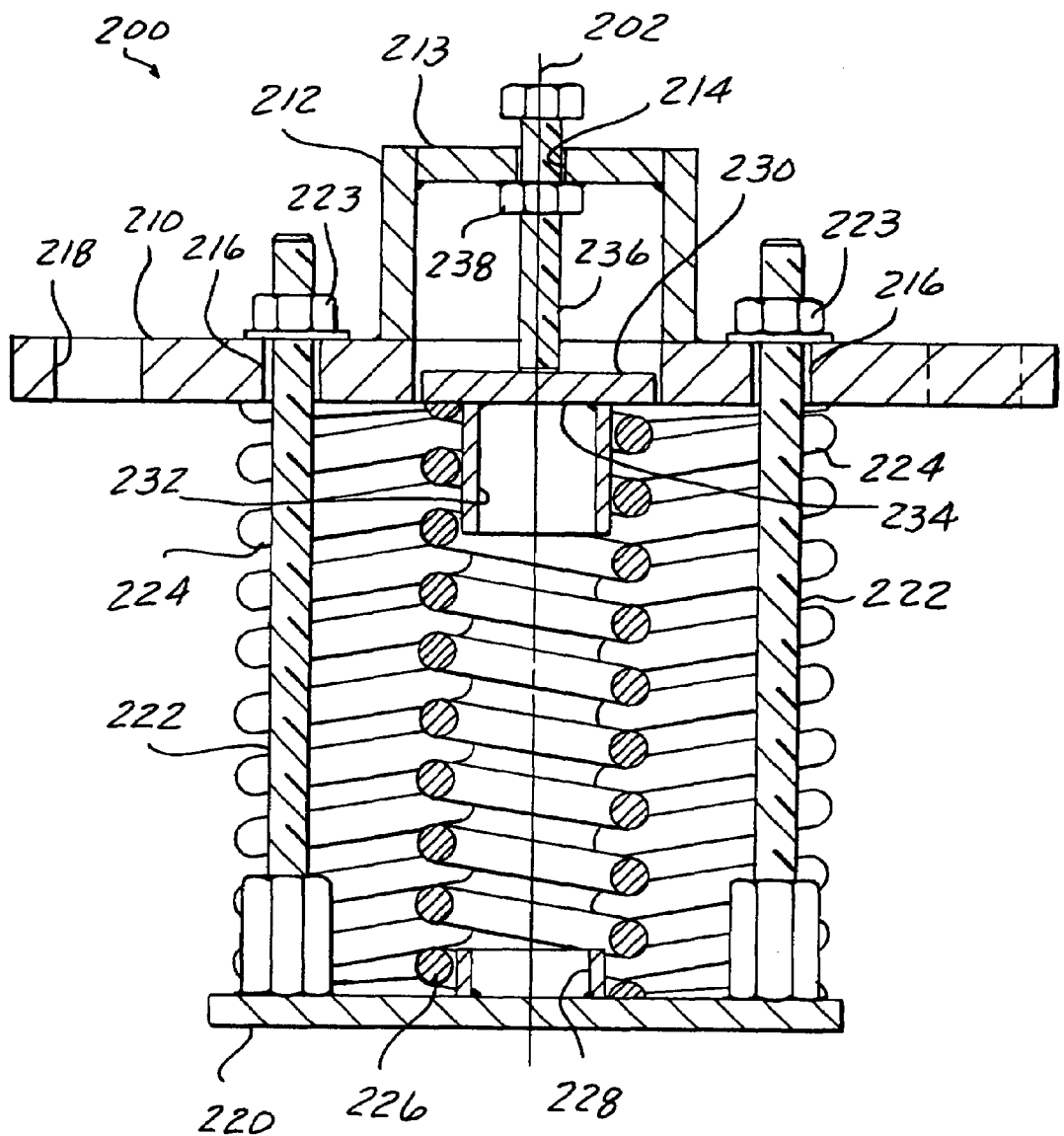
FIG. 15 is a sectional view showing the frequency adjustable support assembly.

In another embodiment, the apparatus 10 of the present invention for isolating and leveling the machine foundation 12 with respect to the substructure 14 may include a support assembly 200 having adjustable frequency characteristics in place of the load bearing member 44 and the support member 20. As seen in FIG. 13, the support assembly 200 provides a substantially rectangular load bearing member 210 that is connected to the anchor ring 38 by four threaded fasteners 46 that extend through corresponding apertures 218 in the load bearing member 210 in substantially the same manner as described with regard to the load bearing member 44. As seen in FIGS. 14-15, the support assembly 200 includes at least one primary support member, such as four outer springs 224, to support the load bearing member 210. In order to adjust the natural frequency of the support assembly 200, at least one adjustable secondary support member is provided, such as the inner spring 226.

In order to isolate the machine foundation 12 with respect to the substructure 14, the primary support member, or the four outer springs 224, extends between the load bearing member 210 and a base plate 220. Each of the outer springs 224 is positioned adjacent to a corner of the load bearing member 210, such that the outer springs 224 are positioned in a grouping having the inner spring 226 at the center of the grouping. It should be noted that although the load bearing member 210 is described as being supported with respect to the base plate 220 by four outer springs 224, the present invention is not limited to four outer springs 224, but rather, the present invention may encompass any number of springs or other resilient load supporting elements. For example, a single spring that encircles the inner spring 226 may be substituted for the four outer springs 224.

The force of the four outer springs 224 is transmitted to the substructure 14 through engagement of the four outer springs 224 with the base plate 220, which is engageable with the concrete well 18 of the substructure 14. The base plate 220 may be connected to the load bearing member 220 by a pair of threaded rods 222 that extend from the base plate 220 toward the load bearing member 210. The pair of threaded rods 222 extends through corresponding apertures 216 in the load bearing member 210 so that the load bearing member 210 may slide along the pair of threaded rods 222 in response to compression and expansion of the outer springs 224 and the inner spring 226. A retainer nut 223 may be provided in threaded engagement with each of the threaded rods 222 to thereby limit the range of motion of the load bearing member 210 with respect to the base plate 220. The base plate 220 may also include a retainer base 228 that is engageable with said inner spring 226 to limit the movement of the inner spring 226 with respect to the base plate 220. It should be noted that although the four outer springs 224 are described as extending between the load bearing member 210 and the base plate 220, the support assembly 200 may be constructed without the base plate 220 or the threaded rods 222, such that the four outer springs 224 and the inner spring 226 directly engage the concrete well 18 of the substructure 14.

The machine foundation 12 is further isolated from the substructure 14 by the secondary support member, or inner spring 226. The inner spring 226 abuts the base plate 220 and biases the load bearing member 210 away from the base plate 220. The inner spring 226 is located near the center of the load bearing member 210 and the base plate 220, but the present invention anticipates that the inner spring 226 need not be positioned at the center of the load bearing member 210 and the base plate 220. The inner spring 226 is separated from the load bearing member 210 by an adjustment member, such as a retainer cap 230 and an associated adjustment rod 236, as will be described in greater detail herein. Although the secondary support member is described herein as the inner spring 226, a plurality of springs may be substituted for the inner spring 226, or one or more of any other well-known resilient load supporting elements may be substituted for the inner spring 226.

The spring characteristics of the support assembly 200 may be modified by compressing or relaxing the inner spring 226 without changing the distance between the anchor ring 38 and the load bearing member 210. Such adjustment of the inner spring 226 is provided by the retainer cap 230 and the adjustment rod 236. The retainer cap 230 includes a cylindrical portion 232 that may be disposed within the end of the inner spring 226, and an end portion 234 that is wider than the cylindrical portion 232 so that the end portion 234 of the retainer cap 230 is seated against an end of the inner spring 226. The adjustment rod 236 extends through an aperture 214 in the load bearing member 210 and through a nut 238 adjacent to the aperture 214 that provides a threaded connection between the adjustment rod 236 and the load bearing member 210. Since the adjustment rod 236 is coaxial with the retainer cap 230 and the inner spring 226, the inner spring 226 biases the retainer cap 230 into engagement with the end of the adjustment rod 236, thereby limiting the expansion of the inner spring 226. Since the adjustment rod 236 engages the retainer cap 230, rotation of the adjustment rod 236 with respect to the load bearing member 210 operates to increase or decrease the distance between the load bearing member 210 and the retainer cap 230 to thereby compress or relax the inner spring 226.

To allow a greater range of adjustment of the length of the inner spring 226, the inner spring 226 and the retainer cap 230 may be partially disposed within a recess 212 formed in the load bearing member 210. The recess 212 is substantially tubular, and extends upward from the remainder of the load bearing member 210. The recess has an end wall 213 on which the aperture 214 and the nut 238 may be located. Thus, adjustment rod 236 may be utilized to position the retainer cap 230 above the four outer springs 224, such that the inner spring 226 extends further than the four outer springs 224.

In operation, one or more of the apparatuses 10 of the present invention placed in the machine foundation 12 may be equipped with the support assembly 200 to allow the natural frequency of the machine foundation 12 to be adjusted over a broad range. For this purpose, the threaded adjustment rod 236 may be turned such that the retainer cap 230 raises or lowers, thereby compressing or decompressing the inner spring 226 of the support assembly 200. By changing the degree of compression of the inner spring 226, the load supported by the inner spring 226 is changed, resulting in a corresponding change in the load carried by the outer springs 224. After adjustments are made to the natural frequency of the machine foundation 12 by adjusting the compressed length of the inner spring 226, the distance between the load bearing member 210 and the anchor ring 38 may be adjusted. Through an iterative process of adjusting the compression of the inner spring 226 and adjusting the height of the load bearing member 210 with respect to the anchor ring 38, the present invention allows equalization of the natural frequencies of a plurality of apparatuses 10 installed in the machine foundation 12, at any given height of the machine foundation 12.

While the invention has been described in connection with what is presently considered to be the most practical and preferred embodiment, it is to be understood that the invention is not to be limited to those disclosed embodiments, but to the contrary, it is intended to cover various modifications and equivalents arrangements included within the spirit and scope of the appended claims. The scope is to be accorded the broadest interpretation so as to encompass all such modifications on equivalent structures as is permitted under the law.

What is claimed:

1. An apparatus for isolating and leveling a machine foundation with respect to a substructure, comprising:
    an enclosure connectable to said machine foundation;
    a bearing member disposed within and adjustably connected to said enclosure;
    at least one primary support member comprising at least one spring within said enclosure positioned between said bearing member and said substructure for isolating said machine foundation from said substructure; and
    at least one secondary support member comprising an additional spring substantially similar to said at least one spring positioned between said bearing member and said substructure for isolating said machine foundation from said substructure, said secondary support member cooperating with said primary support member to support an applied load that includes at least the weight of said enclosure by distributing said applied load according to a proportional distribution by which said applied load is divided into a first load portion that is carried by said primary support member and a second load portion that is carried by said secondary support member, wherein said at least one secondary support member is adjustable independent of application of said applied load by an adjustment rod pressing a retainer cap against said additional spring to change said proportional distribution by adjusting the degree to which said at least one secondary support member compresses in response to a single, predetermined loading that is applied uniformly to said bearing member.

2. The apparatus stated in claim 1, further comprising:
    a base plate engageable with said substructure, and said base plate abutting said at least one primary support member and said at least one secondary support member.

3. The apparatus stated in claim 2, further comprising:
    said base plate including a retainer base engageable with said secondary support member for limiting the movement of said secondary support member with respect to said base plate.

4. The apparatus stated in claim 2, further comprising:
a pair of rods connected to said base plate and extending through corresponding apertures in said bearing member, wherein said bearing member is slidably retained upon said pair of rods.

5. An apparatus for isolating and leveling a machine foundation with respect to a substructure, comprising:
an enclosure connectable to said machine foundation;
a bearing member disposed within and adjustably connected to said enclosure;
at least one primary support member comprising at least one spring within said enclosure positioned between said bearing member and said substructure for isolating said machine foundation from said substructure;
at least one secondary support member comprising an additional spring substantially similar to said at least one spring positioned between said bearing member and said substructure for isolating said machine foundation from said substructure; and
an adjustment member for adjusting the distribution of an applied load between said at least one primary support member and said at least one secondary support member independent of application of said applied load by adjusting the degree to which said at least one secondary support member compresses in response to a single, predetermined loading that is applied uniformly to said bearing member by an adjustment rod pressing a retainer cap against said additional spring.

6. The apparatus stated in claim 5, further comprising:
a base plate engageable with said substructure, and abutting said at least one primary support member and said at least one secondary support member.

7. The apparatus stated in claim 6, further comprising:
said base plate including a retainer base engageable with said secondary support member for limiting the movement of said secondary support member with respect to said base plate.

8. The apparatus stated in claim 7, further comprising:
a pair of rods connected to said base plate and extending through corresponding apertures in said bearing member, wherein said bearing member is slidably retained upon said pair of rods.

9. The apparatus stated in claim 5, wherein the adjustment member is operable to increase the portion of the applied load carried by the primary support member while simultaneously decreasing the portion of the applied load carried by the secondary support member and further operable to decrease the portion of the applied load carried by the primary support member while simultaneously increasing the portion of the applied load carried by the secondary support member.

10. An apparatus for isolating and leveling a machine, comprising:
a substructure;
a machine foundation adapted to support the machine;
an enclosure rigidly connected to said machine foundation;
a bearing member disposed within and adjustably connected to said enclosure, wherein said enclosure is suspended from bearing member such that said bearing member supports at least a portion of the weight of said enclosure and said machine foundation;
a base plate abutting said substructure;
at least one primary support member comprising at least one spring within said enclosure positioned between said bearing member and said base plate for isolating said machine foundation from said substructure;
at least one secondary support member comprising an additional spring substantially similar to said at least one spring positioned between said bearing member and said base plate for isolating said machine foundation from said substructure, wherein said primary support member and said secondary support member cooperate to isolate said machine foundation from said substructure by supporting said bearing member such that said machine foundation is vertically spaced from said substructure so that said primary support member and said secondary support member are operable to dampen vibrations imparted to said machine foundation; and
an adjustment member for adjusting the distribution of an applied load between said at least one primary support member and said at least one secondary support member independent of application of said applied load by adjusting the degree to which said at least one secondary support member compresses in response to a single, predetermined loading that is applied uniformly to said bearing member by an adjustment rod pressing a retainer cap against said additional spring.

11. The apparatus stated in claim 10, wherein said adjustment member further comprises:
said bearing member having a closed-ended recess, wherein said retainer cap is receivable within said closed-ended recess and said adjustment rod is at least partially disposed within said closed-ended recess.

12. The apparatus stated in claim 10, further comprising:
said primary support member includes four springs configured in an array, wherein each said spring is located adjacent to a corresponding corner of said bearing member; and
said secondary support member includes a spring that is positioned at a center point of said array defined by said springs of said primary support member.

13. The apparatus stated in claim 10, wherein the adjustment member is operable to increase the portion of the applied load carried by the primary support member while simultaneously decreasing the portion of the applied load carried by the secondary support member and further operable to decrease the portion of the applied load carried by the primary support member while simultaneously increasing the portion of the applied load carried by the secondary support member.

14. An apparatus for isolating and leveling a machine with respect to a substructure, comprising:
a base surface;
a machine foundation having an opening formed therethrough, the opening extending continuously from a bottom surface of the machine foundation to a top surface of the machine foundation;
at least one anchor member rigidly connected to the machine foundation and disposed at least partially within the opening;
a bearing member for receiving an applied load including at least a portion of the weight of the machine foundation, the bearing member disposed within the opening in the machine foundation, disposed above the anchor member, the bearing member having a threaded aperture formed therethrough at a center point of the bearing member;
a plurality of suspension rods each having an upper end connected to the bearing member and a lower end connected to the anchor member for suspending the machine foundation from the bearing member using the anchor structure;
an adjusting structure having a engagement member and a threaded rod that is rigidly connectable to the engagement member and extends through the threaded aperture of the bearing member such that rotation of the threaded rod with respect to the bearing member is operable to adjust the elevation of the engagement member with respect to the bearing member;

a plurality of primary springs positioned in an array around the threaded aperture of the bearing member, the primary springs each having a first end in direct engagement with the base surface and a second end in direct engagement with the bearing member; and a secondary spring having a first end in direct engagement with the base surface and a second end in direct engagement with the engagement member of the adjusting structure, wherein the primary springs and the secondary spring cooperate to support an applied load that is applied to the machine foundation is transmitted from the machine foundation to the bearing member through the anchor structure and the suspension rods and then transmitted from the bearing member to the base surface through the primary springs and the secondary spring according to a proportional distribution by which the applied load is distributed into a first load portion that is carried by said primary springs and a second load portion that is carried by said secondary spring, such that adjustment of elevation of the engagement member of the adjustment member with respect to the bearing member is operable to change the proportional distribution, and such that the machine foundation, that bearing member, the anchor structure and the suspension rods move in unison in response to deflection of the primary spring and the secondary spring.

* * * * *

UNITED STATES PATENT AND TRADEMARK OFFICE
CERTIFICATE OF CORRECTION

PATENT NO. : 7,757,441 B1
APPLICATION NO. : 11/333861
DATED : July 20, 2010
INVENTOR(S) : Whittaker It is certified that error appears in the above-identified patent and that said Letters Patent is hereby corrected as shown below:

1. On the Title Page, Item (63) under the second entitled "Related U.S. Application Data," in line 5, please delete "10/280,446" and insert --10/280,445--;

2. In Col. 1, line 10, please delete "10/280,446" and insert --10/280,445--;

3. In Col. 2, line 59, please delete "like reference" and insert --like-reference--;

4. In Col. 2, line 63, please delete "a MRI" and insert --an MRI--;

5. In Col. 3, line 39, please delete "the apparatus" and insert --a seismic restraint apparatus--;

6. In Col. 4, line 5, please delete "10" and insert --12--;

7. In Col. 4, line 20, please delete "a MRI" and insert --an MRI--;

8. In Col. 5, line 43, please delete "structure" and insert --member--;

9. In Col. 7, line 5, please delete "outer" and insert --elastomer-coated--;

10. In Col. 7, line 6, please delete "height to width" and insert --height-to-width--;

11. In Col. 7, line 26, please delete "111" and insert --112--;

12. In Col. 7, line 28, please delete "111" and insert --112--;

13. In Col. 7, line 30, please delete "111" and insert --112--;

14. In Col. 8, line 17, please delete "bolt" and insert --plate--;

15. In Col. 9, line 21, please delete "119 is seated" and insert --119 seated--;

Signed and Sealed this

Fourteenth Day of September, 2010

David J. Kappos
*Director of the United States Patent and Trademark Office*

16. In Col. 9, line 21, please delete "114" and insert --14--;

17. In Col. 10, line 2, please delete "34" and insert --134--;

18. In Col. 10, line 56, please delete "220" and insert --210--; and

19. In Col. 11, lines 56-57, please delete "Thus, adjustment" and insert --Thus, the adjustment--.